United States Patent
Frederick et al.

(10) Patent No.: US 9,663,150 B2
(45) Date of Patent: May 30, 2017

(54) SLOT PROTECTORS FOR HOOD ASSEMBLIES

(71) Applicant: Toyota Motor Engineering & Manufacturing North America, Inc., Erlanger, KY (US)

(72) Inventors: Scott L. Frederick, Brighton, MI (US); Mark A. Gawronski, Ypsilanti, MI (US); Matthew A. Jansma, Saline, MI (US)

(73) Assignee: Toyota Motor Engineering & Manufacturing North America, Inc., Erlanger ( * ) Notice: Subject to any disclaimer, the term of this patent is extended or adjusted under 35 U.S.C. 154(b) by 52 days.

(21) Appl. No.: 14/683,546

(22) Filed: Apr. 10, 2015

(65) Prior Publication Data

US 2016/0200365 A1    Jul. 14, 2016

Related U.S. Application Data

(60) Provisional application No. 62/101,736, filed on Jan. 9, 2015.

(51) Int. Cl.
*B60R 21/34* (2011.01)
*B62D 25/12* (2006.01)

(52) U.S. Cl.
CPC .............. *B62D 25/12* (2013.01); *B60R 21/34* (2013.01); *B60R 2021/343* (2013.01)

(58) Field of Classification Search
CPC ......... B62D 25/10; B60R 21/38; B60R 21/34; B60R 2021/343; B60R 2021/346

USPC .......... 180/69.2; 296/187.04, 187.09, 193.11
See application file for complete search history.

(56) References Cited

U.S. PATENT DOCUMENTS

| | | | | |
|---|---|---|---|---|
| 6,146,071 A * | 11/2000 | Norkus | ................ | F16B 37/044 |
| | | | | 296/187.09 |
| 7,997,642 B2 | 8/2011 | Rocheblave et al. | | |
| 8,333,425 B2 * | 12/2012 | Yoshida | ............... | B62D 21/152 |
| | | | | 296/187.09 |
| 2006/0064845 A1 * | 3/2006 | Fujii | ...................... | B60R 21/34 |
| | | | | 16/82 |
| 2006/0163915 A1 * | 7/2006 | Ikeda | ..................... | B60R 21/34 |
| | | | | 296/193.11 |
| 2008/0100073 A1 * | 5/2008 | Mitsuyama | .......... | B62D 25/163 |
| | | | | 293/132 |
| 2009/0050388 A1 * | 2/2009 | Leong | .................... | B60R 21/38 |
| | | | | 180/69.21 |
| 2009/0121519 A1 * | 5/2009 | Ackland | .............. | B62D 25/105 |
| | | | | 296/187.09 |

(Continued)

FOREIGN PATENT DOCUMENTS

| | | |
|---|---|---|
| DE | 102005038682 | 4/2006 |
| JP | 2007083831 | 4/2007 |

(Continued)

*Primary Examiner* — H Gutman
(74) *Attorney, Agent, or Firm* — Dinsmore & Shohl LLP

(57) ABSTRACT

A hood assembly includes an outer panel that is connected to an inner panel. The inner panel includes one or more elongated slots that extend lengthwise in a vehicle longitudinal direction. The elongated slots can provide a line of weakness to reduce deceleration of an impacting body. A slot protector is fitted within the elongated slots. The slot protector is formed of a flexible material that facilitates an interference fit within the slot.

20 Claims, 6 Drawing Sheets

(56) References Cited

U.S. PATENT DOCUMENTS

| | | | | |
|---|---|---|---|---|
| 2010/0045070 A1* | 2/2010 | Rocheblave | ............ | B60R 21/34 |
| | | | | 296/187.04 |
| 2010/0214801 A1* | 8/2010 | Yonezawa | ............ | B60Q 1/0491 |
| | | | | 362/549 |
| 2011/0068607 A1* | 3/2011 | Ott | ............ | B60R 21/34 |
| | | | | 296/192 |
| 2013/0181484 A1* | 7/2013 | Grattan | ............ | B62D 25/105 |
| | | | | 296/193.11 |
| 2015/0054305 A1* | 2/2015 | Steinhilb | ............ | B62D 25/105 |
| | | | | 296/187.04 |
| 2015/0329147 A1* | 11/2015 | Iwano | ............ | B62D 25/105 |
| | | | | 296/193.11 |
| 2015/0360729 A1* | 12/2015 | Chikada | ............ | B62D 25/105 |
| | | | | 296/187.09 |
| 2016/0083019 A1* | 3/2016 | Takada | ............ | B60R 21/34 |
| | | | | 296/193.11 |
| 2016/0251033 A1* | 9/2016 | Kolar, Jr. | ............ | B60R 21/34 |

FOREIGN PATENT DOCUMENTS

| | | |
|---|---|---|
| JP | 2011046325 | 3/2011 |
| JP | 2013014198 | 1/2013 |

* cited by examiner

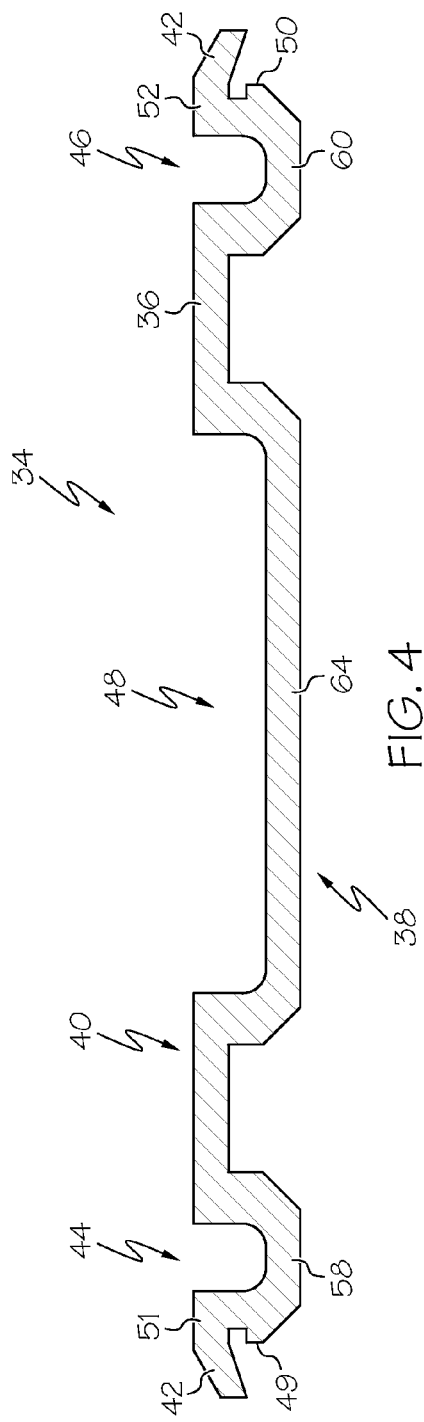
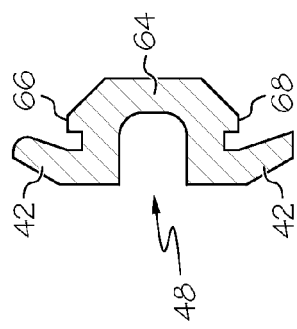

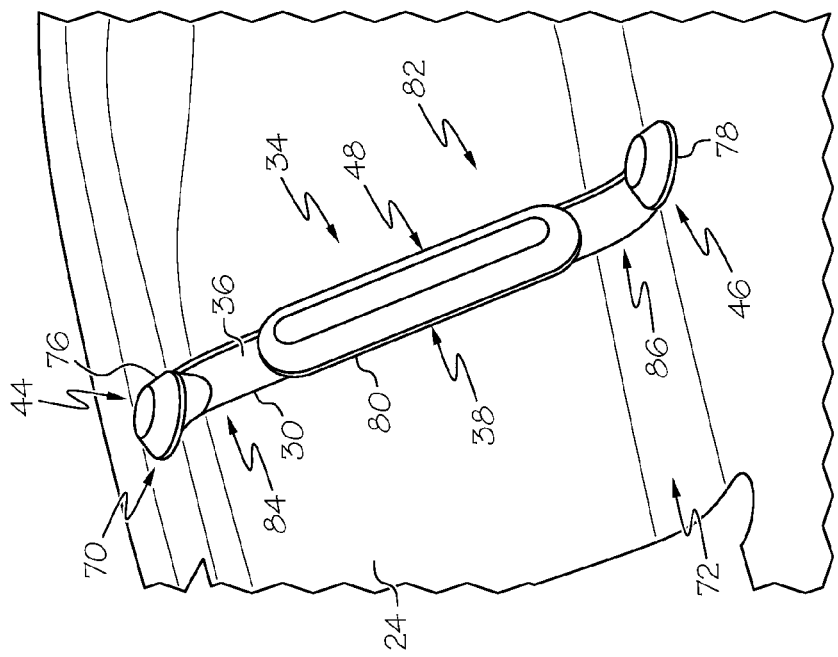
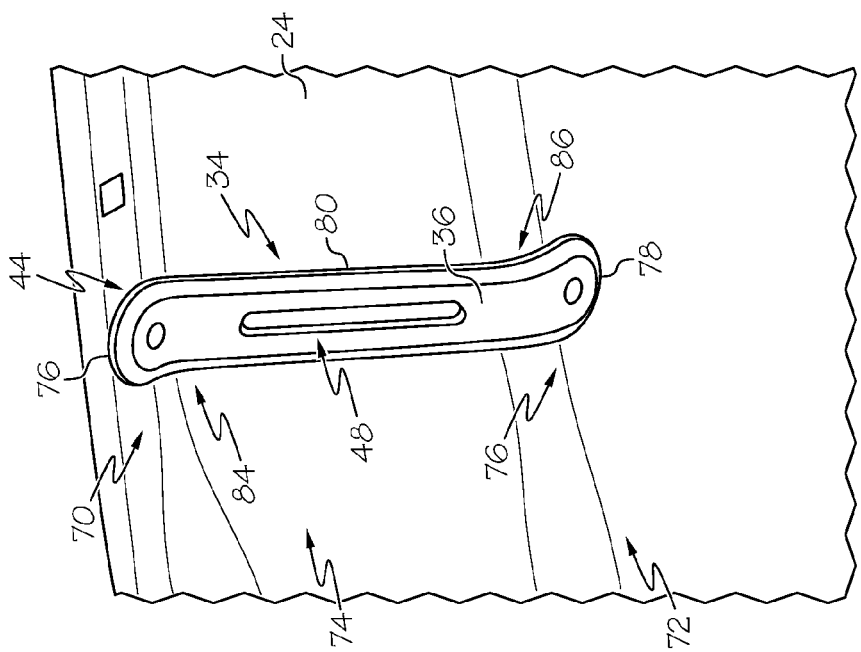

SLOT PROTECTORS FOR HOOD ASSEMBLIES

CROSS-REFERENCE TO RELATED APPLICATIONS

This application claims the benefit of priority to U.S. Provisional Application No. 62/101,736, titled "Slot Protectors for Hood Assemblies," filed Jan. 9, 2015, the details of which are incorporated herein by reference in their entirety.

TECHNICAL FIELD

The present specification generally relates to hood assemblies and vehicles that include hood assemblies, and more specifically, hood assemblies that include a slot protector.

BACKGROUND

Vehicle hood structures include structures wherein a hood outer panel and a hood inner panel are coupled together. In such structures, the hood inner panel may include one or more slots with length directions oriented in the vehicle body front-rear direction, forming a line of weakness. In such structures, when an impacting body impacts the hood, a high proportion of the load acting on the impacting body is load due to the inertia of the hood panel. Such lines of weakness can be provided to reduce deceleration of the impacting body.

SUMMARY

In one embodiment, a hood assembly includes an outer panel that is connected to an inner panel. The inner panel includes one or more elongated slots that extend lengthwise in a vehicle longitudinal direction. The elongated slots can provide a line of weakness to reduce deceleration of an impacting body. A slot protector is fitted within the elongated slots. The slot protector is formed of a flexible material that facilitates an interference fit within the slot.

In another embodiment, a hood assembly for a vehicle includes a hood inner panel configured to be connected to a hood outer panel. The hood inner panel has an elongated slot extending through the hood inner panel that extends lengthwise in a vehicle longitudinal direction. A slot protector is received by the elongated slot and has an inner face and an outer face. The slot protector includes a protector body including end installation regions and a central installation region located between the end installation regions. The end installation regions extend outwardly from the inner face of the protector body and are received through opposite ends of the elongated slot.

In another embodiment, a vehicle includes a vehicle body including a hood assembly provided at a front portion of the vehicle body arranged and configured to cover a region above an engine room. The hood assembly includes a hood outer panel and a hood inner panel disposed at an inner side of the hood outer panel. The hood inner panel has an elongated slot extending through the hood inner panel that extends lengthwise in a vehicle longitudinal direction. A slot protector is received by the elongated slot and has an inner face and an outer face. The slot protector includes a protector body including end installation regions and a central installation region located between the end installation regions. The end installation regions extend outwardly from the inner face of the protector body and are received through opposite ends of the elongated slot.

In another embodiment, a slot protector includes a flexible protector body having an inner face and an outer face. The protector body further includes end installation regions and a central installation region located between the end installation regions. The end installation regions extend outwardly from the inner face of the protector body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a section view of the slot protector along line A-A of FIG. 3 according to one or more embodiments shown or described herein;

FIG. 5 depicts another section view of the slot protector along line B-B of FIG. 3 according to one or more embodiments shown or described herein;

FIG. 7 depicts an exterior view of a slot protector in an installed configuration according to one or more embodiments shown or described herein; and FIG. 8 depicts an interior view of a slot protector in an installed configuration according to one or more embodiments shown or described herein.

DETAILED DESCRIPTION

Vehicles according to the present specification include a hood assembly including an outer panel that is connected to an inner panel. The inner panel includes one or more elongated slots that extend lengthwise in a vehicle longitudinal direction. The elongated slots can provide a line of weakness to reduce deceleration of an impacting body. A slot protector is fitted within the elongated slots. The slot protector is formed of a flexible material that facilitates an interference fit within the slot.

A first embodiment of a vehicle hood assembly is described hereinafter by using FIG. 1. Note that arrow FR shown appropriately in these drawings indicates the vehicle front side (vehicle longitudinal direction), arrow UP indicates the vehicle upper side (vehicle vertical direction), and arrow OUT indicates the vehicle transverse direction outer side.

Figure 1:
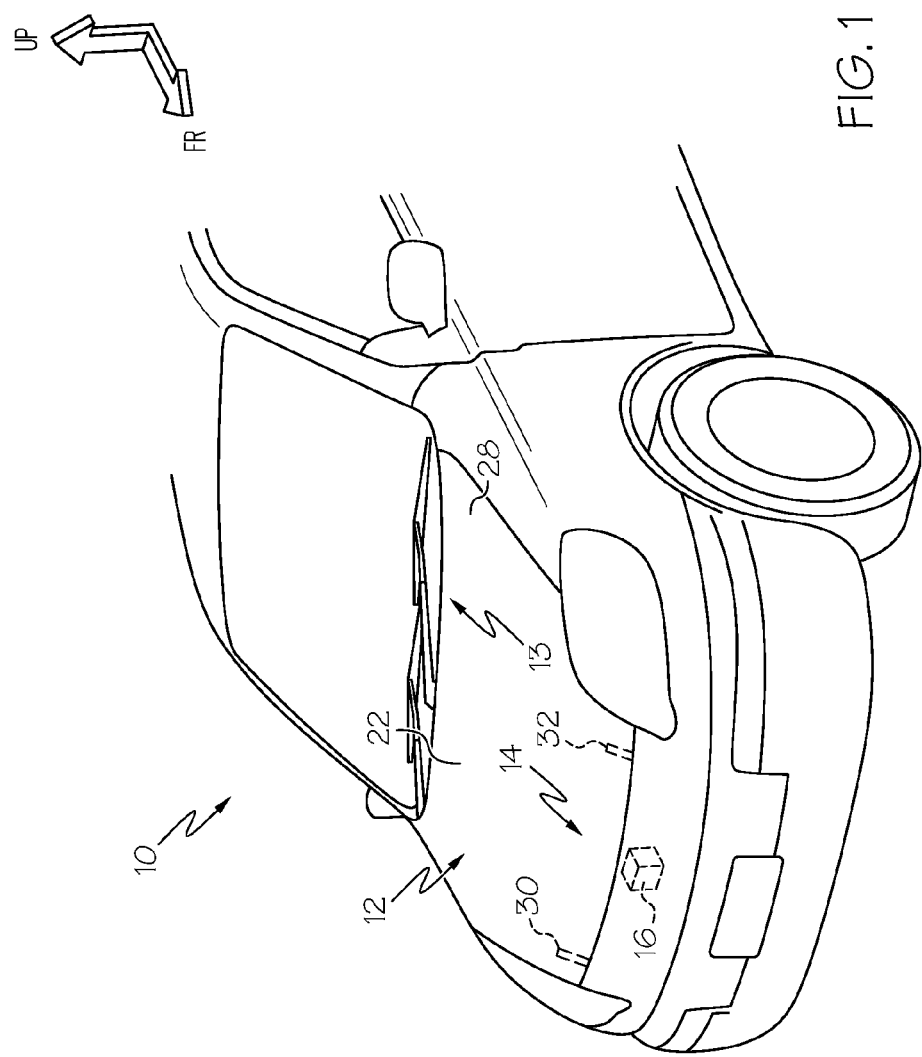
FIG. 1 schematically depicts a perspective view of a vehicle according to one or more embodiments shown or described herein.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

As shown in FIG. 1, a hood assembly 12 is provided at the front portion of a vehicle main body of a vehicle 10 so as to cover a region above the engine room. At the hood assembly 12, a front end portion 14 can be opened and closed in the vehicle vertical direction with respect to the vehicle main body by a pair of left and right hinge arms that are provided at a rear end portion 13 in the vehicle longitudinal direction. A hood lock mechanism 16 is disposed at the vehicle transverse direction central portion at the front end portion 14 of the hood assembly 12 of the vehicle main body of the vehicle 10.

Figure 2:
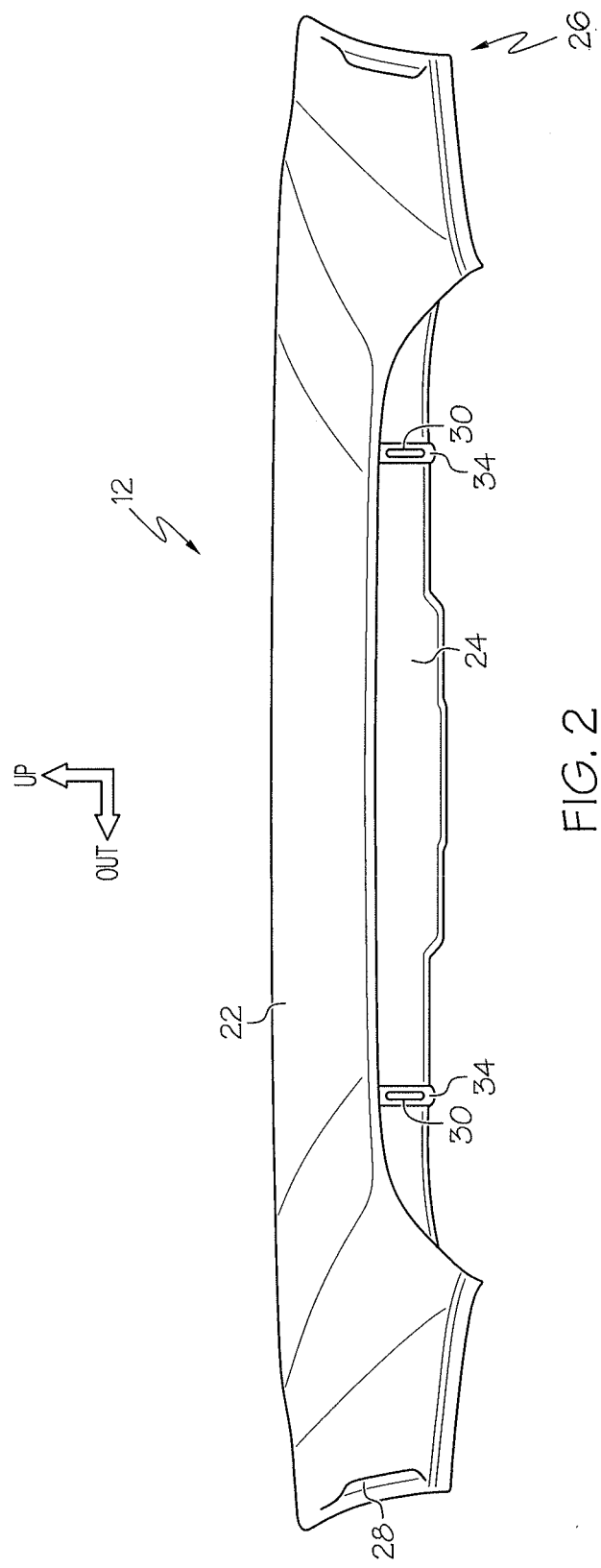
FIG. 2 depicts a front view of hood inner and outer panels of the vehicle of FIG. 1 including slot protectors according to one or more embodiments shown or described herein.

Referring also to FIG. 2, the hood assembly 12 has a hood outer panel 22 (FIG. 1) that is disposed at the vehicle upper side (the vehicle outer side) along the vehicle transverse direction and the vehicle longitudinal direction, and a hood inner panel 24 (FIG. 2) that is disposed at the inner side of the hood outer panel 22 along the vehicle transverse direction and the vehicle longitudinal direction. The hood assembly 12 is formed as a closed cross-sectional structure due to a peripheral edge portion 26 of the hood inner panel 24 and a peripheral edge portion 28 of the hood outer panel 22 being connected together. The hood outer panel 22 structures the upper surface of the hood assembly 12, and the hood inner panel 24 structures the lower surface of the hood assembly 12, and the region between the hood outer panel 22 and the hood inner panel 24 may be hollow.

The hood inner panel 24 includes one or more elongated slots 30 and 32 that extend lengthwise in a vehicle longitudinal direction located at the front end portion 14 of the hood assembly 12 on opposite sides of the hood lock mechanism 16. The elongated slots 30 and 32 can provide a line of weakness to facilitate deformation of the hood assembly 12 and to reduce deceleration of an impacting body. As shown in FIG. 2, the slots 30 and 32 may each be provided with a slot protector 34. The slot protector 34 can fill the slots 30 and 32 without impeding the impact performance of the slots 30 and 32.

Figure 3:
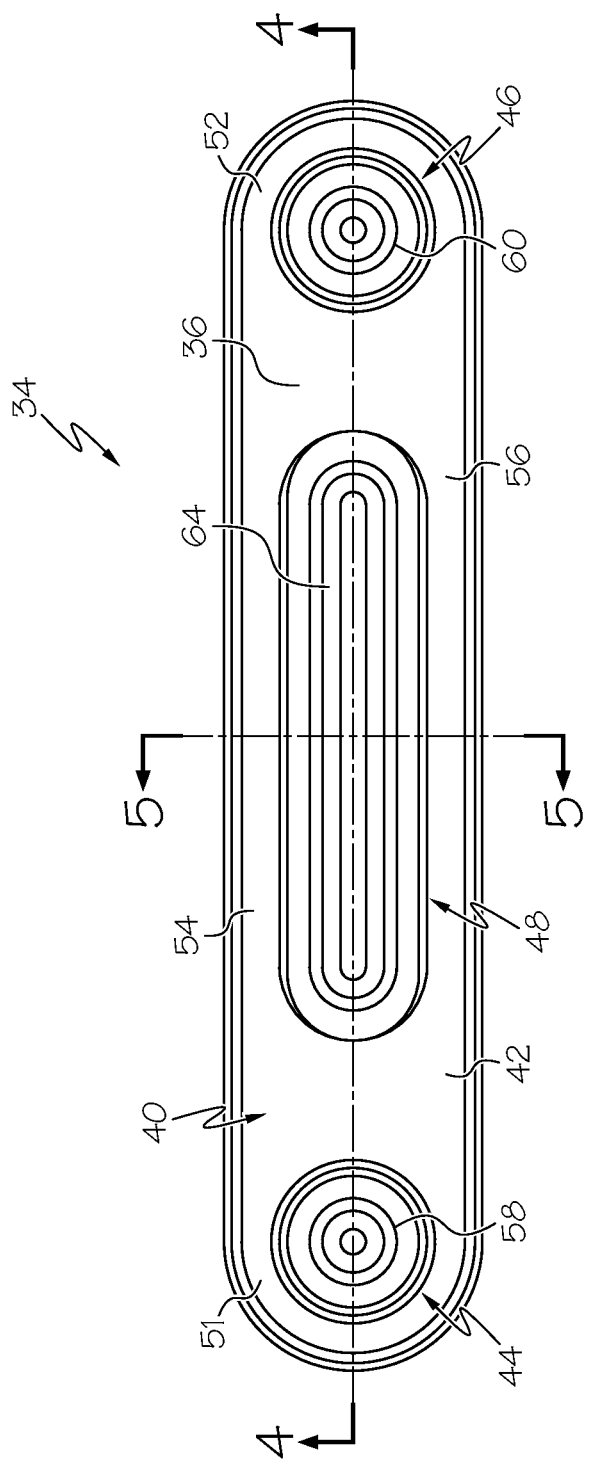
FIG. 3 depicts a plan view of a slot protector according to one or more embodiments shown or described herein.

Referring to FIGS. 3-5, the slot protector 34 includes a protector body 36 formed of a resilient, flexible material, such as molded rubber, plastic, foam or a combination of materials (e.g., a laminate of foam and plastic film). In some embodiments, the protector body 36 is formed a single strip of material. The protector body 36 includes an inner face 38 and an outer face 40. The inner face 38 may be referred to as an installation face as it is the face inserted into the slot 30, 32 during installation. The protector body 36 further includes a sealing perimeter 42, end installation regions 44 and 46 and a central installation region 48 located therebetween. As can be seen by FIGS. 4 and 5, the sealing perimeter 42 is formed as a flange that extends both outwardly from ends 51 and 52 and sides 54 and 56 of the protector body 36, but also in a direction away from the outer face 40, toward the inner face 38 to provide a sealing feature against the hood inner panel 24, as will be described below.

The end installation regions 44 and 46 are formed as recesses in the outer face 40 including body portions 58 and 60 that extend from the outer face 40 toward the inner face 38. In the illustrated example, the end installation regions 44 and 46 are formed as oval-shaped dimples that are sized and shaped to mate with ends of the slots 30, 32. However, other shapes are possible, such as rectangular or a combination of shapes, depending, at least in part, on the shape of the ends of the slots into which the end installation regions 44 and 46 are inserted. Referring particularly to FIG. 4, the end installation regions 44 and 46 may further include inner installation flanges 49 and 50. The inner installation flanges 49 and 50 extend outwardly from the body portions 58 and 60, spaced from the sealing perimeter 42 to provide a gap into which the hood inner panel 24 can be received. The sealing perimeter 42 and the inner installation flanges 49 and 50 can provide a somewhat tortuous path for sealing the slot protector 34 in the slots 30 and 32, while providing a snap-in feature that provides tactile feedback during installation.

The central installation region 48 is likewise formed as a recess in the outer face 40 including a body portion 64 that extends from the outer face 40 toward the inner face 38. In the illustrated example, the central installation region 48 is formed as an oval-shaped recess that is sized and shaped to mate with a central portion of the slots 30, 32. However, other shapes are possible, such as rectangular or a combination of shapes, depending, at least in part, on the shape of the central portion of the slots into which the central installation region 48 is inserted. In some embodiments, a length of the central installation region 48 may be greater than lengths of both end installation regions 44 and 46 combined, such as at least about 1.5 times, such as at least about 2 times the length of the both end installation regions 44 and 46 combined. Referring particularly to FIG. 5, the central installation region 48 may further include inner installation flanges 66 and 68. The inner installation flanges 66 and 68 may extend outwardly from the body portion 64, spaced from the sealing perimeter 42 to provide gaps into which the hood inner panel 24 can be received. The sealing perimeter 42 and the inner installation flanges 66 and 68 can provide a somewhat tortuous path for sealing the slot protector 34 in the slots 30 and 32, while providing a snap-in feature that provides tactile feedback during installation.

Figure 6:
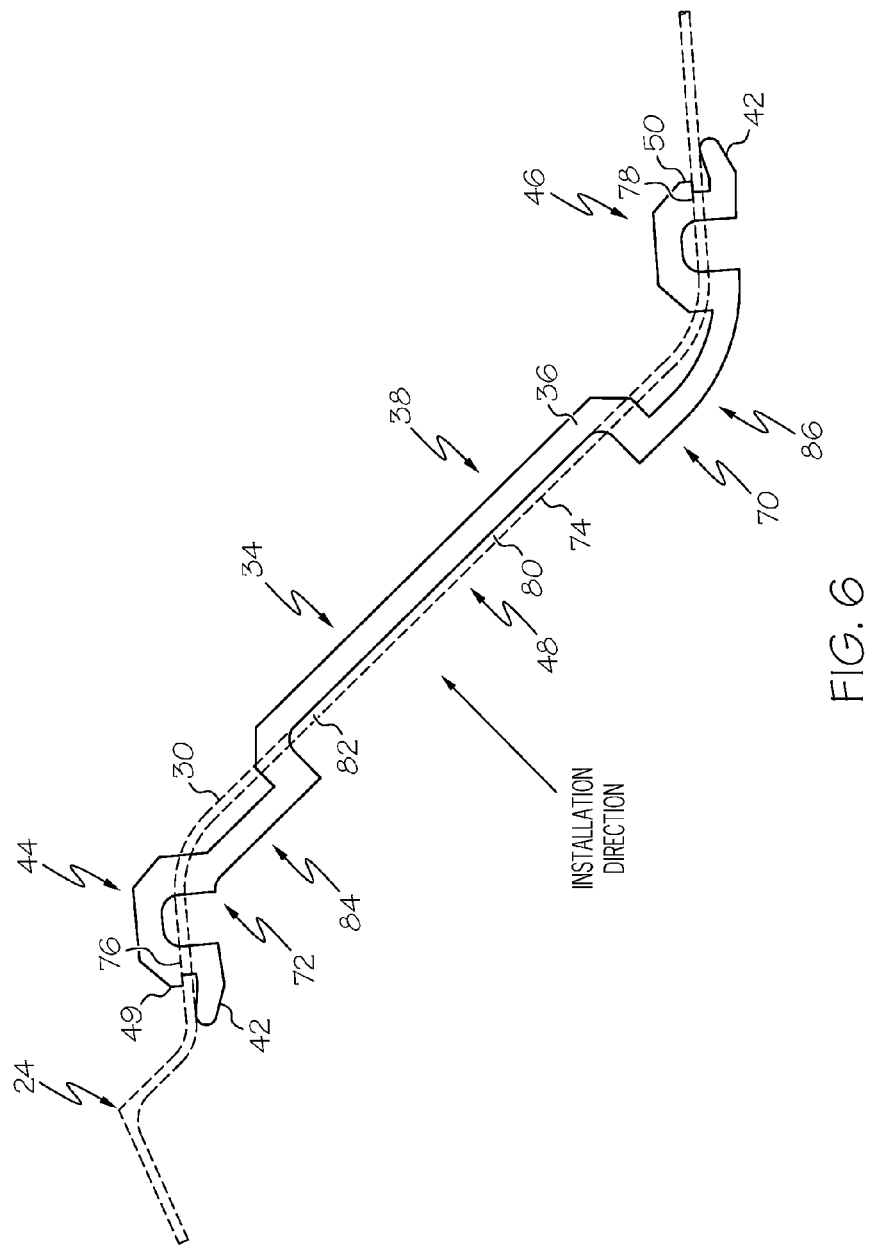
FIG. 6 depicts a side view of the slot protector of FIG. 3 in an installed configuration according to one or more embodiments shown or described herein.

Referring to FIGS. 6-8, the slot protector 34 is illustrated in an installed configuration with the inner face 38 installed through the slot 30. As can be seen, the flexibility of the protector body 36 allows the slot protector 34 to be installed over curved portions 70 and 72 of the hood inner panel 24. In this example, the end installation regions 44 and 46 and the central installation region 48 are inserted through the slot 30 from an exterior side 74 of the hood inner panel 24. The end installation regions 44 and 46 may be inserted until ends 76 and 78 of the slot 30 are received within the gaps between the inner installation flanges 49 and 50 and the sealing perimeter 42 (FIG. 6). Likewise, the central installation region 48 may be inserted until central portions 80 of the slot 30 are received within gaps between the inner installation flanges 66 and 68 and the sealing perimeter 42 (FIG. 5). With this arrangement, only the end installation regions 44 and 46 and the central installation region 48 extend outwardly beyond an interior side 82 of the hood inner panel 24 with intermediate regions 84 and 86 between the central installation region 48 and the end installation regions 44 and 46 remaining on the exterior side 74 of the hood inner panel 24.

The above-described slot protectors can provide a flexible interference fit piece having a deformable design that reduces interference of impact characteristics of the hood inner panel. The slot protectors are also provided in regions of the hood inner panel that can be contacted by a user of the vehicle, for example, when opening the hood assembly and provide a soft feel when contacted by the user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hood assembly for a vehicle comprising:
a hood inner panel configured to be connected to a hood outer panel, the hood inner panel having an elongated slot extending through the hood inner panel that extends lengthwise in a vehicle longitudinal direction; and
a slot protector received by the elongated slot having an inner face and an outer face, the slot protector including a protector body including end installation regions and a central installation region located between the end installation regions, wherein the end installation regions extend outwardly from the inner face of the protector body and are received through opposite ends of the elongated slot.

2. The hood assembly of claim 1, wherein the hood inner panel has an exterior side and an interior side, wherein the end installation regions of the protector body are inserted through the exterior side and are visible from the interior side of the hood inner panel.

3. The hood assembly of claim 1, wherein the central installation region extends outwardly from the inner face of the protector body and is received through the elongated slot.

4. The hood assembly of claim 3, wherein the central installation region is spaced from the end installation regions by intermediate regions.

5. The hood assembly of claim 4, wherein the hood inner panel has an exterior side and an interior side, the intermediate regions located on the exterior side with the central installation region inserted through the exterior side and is visible from the interior side of the hood inner panel.

6. The hood assembly of claim 1, wherein the protector body includes opposite ends and elongated sides extending between the opposite ends, the protector body further comprising a sealing perimeter that is formed as a flange that extends outwardly from the opposite ends and elongated sides of the protector body.

7. The hood assembly of claim 6, wherein the sealing perimeter also extends in a direction away from the outer face.

8. The hood assembly of claim 6, wherein the end installation regions each include a body portion extending outwardly from the inner face of the protector body and an inner installation flange that is spaced from the sealing perimeter to provide a gap in which the hood inner panel is received.

9. The hood assembly of claim 8, wherein the central installation region includes a body portion extending outwardly from the inner face of the protector body and an inner installation flange that is spaced from the sealing perimeter to provide another gap in which the hood inner panel is received.

10. A vehicle comprising:
a vehicle body including a hood assembly provided at a front portion of the vehicle body arranged and configured to cover a region above an engine room, the hood assembly comprising:
a hood outer panel;
a hood inner panel disposed at an inner side of the hood outer panel, the hood inner panel having an elongated slot extending through the hood inner panel that extends lengthwise in a vehicle longitudinal direction;
a slot protector received by the elongated slot having an inner face and an outer face, the slot protector including a protector body including end installation regions and a central installation region located between the end installation regions, wherein the end installation regions extend outwardly from the inner face of the protector body and are received through opposite ends of the elongated slot.

11. The vehicle of claim 10, wherein the elongated slot is a first elongated slot and the slot protector is a first slot protector, the hood inner panel having a second elongated slot extending through the hood inner panel that extends lengthwise in a vehicle longitudinal direction and a second slot protector received by the second elongated slot having an inner face and an outer face, the second slot protector including a protector body including end installation regions and a central installation region located between the end installation regions, wherein the end installation regions of the second slot protector extend outwardly from the inner face of the protector body and are received through opposite ends of the second elongated slot.

12. The vehicle of claim 11, wherein the first elongated slot and the second elongated slot are located at a front end portion of the hood assembly that can be moved between open and closed positions.

13. The vehicle of claim 12, wherein the first elongated slot and the second elongated slot are located at opposite sides of a hood lock mechanism.

14. The vehicle of claim 10, wherein the hood inner panel has an exterior side and an interior side, wherein the end installation regions of the protector body are inserted through the exterior side and are visible from the interior side of the hood inner panel.

15. The vehicle of claim 10, wherein the central installation region extends outwardly from the inner face of the protector body and is received through the elongated slot.

16. The vehicle of claim 15, wherein the central installation region is spaced from the end installation regions by intermediate regions and the hood inner panel has an exterior side and an interior side, the intermediate regions located on the exterior side with the central installation region inserted through the exterior side and is visible from the interior side of the hood inner panel.

17. The vehicle of claim 10, wherein the protector body includes opposite ends and elongated sides extending between the opposite ends, the protector body further comprising a sealing perimeter that is formed as a flange that extends outwardly from the opposite ends and elongated sides of the protector body.

18. The vehicle of claim 17, wherein the sealing perimeter also extends in a direction away from the outer face.

19. The vehicle of claim 17, wherein the end installation regions each include a body portion extending outwardly from the inner face of the protector body and an inner installation flange that is spaced from the sealing perimeter to provide a gap in which the hood inner panel is received.

20. The vehicle of claim 19, wherein the central installation region includes a body portion extending outwardly from the inner face of the protector body and an inner installation flange that is spaced from the sealing perimeter to provide another gap in which the hood inner panel is received.

\* \* \* \* \*